United States Patent
Weh et al.

(10) Patent No.: US 7,267,140 B2
(45) Date of Patent: Sep. 11, 2007

(54) CONNECTING COUPLING WITH A SWITCH UNIT

(75) Inventors: Erwin Weh, Siemensstrasse 5, 89257 Illertissen (DE); Wolfgang Weh, Siemensstrasse 5, 89257 Illertissen (DE)

(73) Assignees: Erwin Weh (DE); Wolfgang Weh (DE)

( * ) Notice: Subject to any disclaimer, the term of this patent is extended or adjusted under 35 U.S.C. 154(b) by 216 days.

(21) Appl. No.: 10/506,568

(22) PCT Filed: Mar. 1, 2003

(86) PCT No.: PCT/EP03/02111
§ 371 (c)(1),
(2), (4) Date: Mar. 8, 2005

(87) PCT Pub. No.: WO03/074923
PCT Pub. Date: Sep. 12, 2003

(65) Prior Publication Data
US 2005/0161097 A1    Jul. 28, 2005

(30) Foreign Application Priority Data
Mar. 2, 2002    (DE)    ............... 202 03 296 U

(51) Int. Cl.
*F16L 37/36*    (2006.01)

(52) U.S. Cl. .................. 137/614.11; 137/614.03; 285/316

(58) Field of Classification Search ........... 137/614.03, 137/614.04, 614.05, 614.06, 614.11; 251/149.9, 251/149.6; 285/314–317
See application file for complete search history.

(56) References Cited

U.S. PATENT DOCUMENTS

| | | | |
|---|---|---|---|
| 3,710,823 A * | 1/1973 | Vik ........................... | 285/316 |
| 3,731,705 A * | 5/1973 | Butler .................... | 137/614.06 |
| 4,074,698 A * | 2/1978 | Hobson et al. ........ | 137/614.06 |
| 4,181,150 A * | 1/1980 | Maldavs ................ | 137/614.06 |
| 4,222,411 A | 9/1980 | Herzan et al. | |
| 4,347,870 A * | 9/1982 | Maldavs ................ | 137/614.05 |
| 6,035,894 A | 3/2000 | Weh et al. | |

FOREIGN PATENT DOCUMENTS

| | | |
|---|---|---|
| WO | WO 00 52378 A | 9/2000 |
| WO | WO98/05898 | 9/2000 |

* cited by examiner

*Primary Examiner*—Kevin Lee
(74) *Attorney, Agent, or Firm*—Knobbe Martens Olson & Bear, LLP

(57) ABSTRACT

A connection coupling for transferring gaseous and liquid fluids comprises a switch unit for actuating valves via a switch slide. The switch unit includes an eccentric shaft. The switch slide is coupled to an outer ring slide by at least one bolt.

9 Claims, 2 Drawing Sheets

CONNECTING COUPLING WITH A SWITCH UNIT

BACKGROUND OF THE INVENTION

The invention relates to a connection coupling for the transfer of gaseous and/or liquid fluids, especially for filling the gas tanks of motor vehicles.

Such connection couplings are to ensure a secure and quickly connectable transfer of a fluid from a pressurized source, e.g. from a filling station to a vehicle. The particularly important aspect in this respect is the simple and secure ability to operate the same, so that even in case of high filling pressures of 200 bars and more, easy handling is ensured.

Such a connection coupling is described in WO 98/05898 of the applicant, with the quick-action connection coupling having a housing with a fluid inlet and a fluid outlet as well as several valves in order to ensure a secure sealing of the quick-action connection coupling until the complete establishment of the connection. Said valves are switched after the attachment of the quick-action connection coupling by twisting a control lever in a predetermined sequence, with the discharge valve being opened first by sliding the quick-action connection coupling onto a connection nipple, whereupon following further movement of the control lever the collet chucks acting as locking elements are closed and finally the inlet valve is opened. The control valve is in engagement via an eccentric shaft with the sliding sleeve for activating the collect chucks and with a sealing piston which also releases the fluid inlet after the performed connection of the connection coupling.

As a result of twisting of the connection tubes it is possible that the control lever assumes an unfavorable position (e.g. towards the right side), which is highly inconvenient for a left-handed person when operating the connection coupling.

Although the known connection coupling has proven its worth by its especially secure connection capabilities, it is still worthy of improvement with respect to its handling.

SUMMARY OF THE INVENTION

The invention is accordingly based on the object of providing a connection coupling, especially a quick-action connection coupling of the kind mentioned above, which in combination with a compact configuration offers especially simple handling.

This object is achieved by a connection coupling according to the features of claim 1. Preferred further developments of the invention are the subject matter of the dependent claims.

The proposed connection coupling is especially suitable for use in a quick-action connection coupling for refueling natural gas motor vehicles. An especially simple and compact design is obtained because the control lever in combination with the switch unit is provided with a configuration so as to be rotatable about the central axis and thus it can assume any rotary position as desired by the user during the connection process. In particular, the switch unit can be twisted in a preferred embodiment by the mutually opposite ring slides to a position suitable for the user, thus offering an especially secure and convenient handling.

As a result of pass-through slots integrated within the connection coupling in the middle housing portion, a secure guidance of the switch unit is achieved and thus a stable and compact configuration of the connection coupling is obtained. Since the switch unit is situated outside of the pressure region, simple and easy operation is ensured, so that the quick-action connection coupling can also be connected by non-professionals with ease.

In order to prevent the build-up of pressure in the case of any leakages of a seal, a ventilation bore is preferably provided in the housing of the switch unit. The same is preferably closed off with a sintered filter or a similar material, which thus prevents the entrance of dirt.

BRIEF DESCRIPTION OF THE DRAWINGS

An embodiment of the invention is now explained and described in closer detail by reference to the enclosed drawings, wherein.

DESCRIPTION OF THE PREFERRED EMBODIMENT

Figure 1:
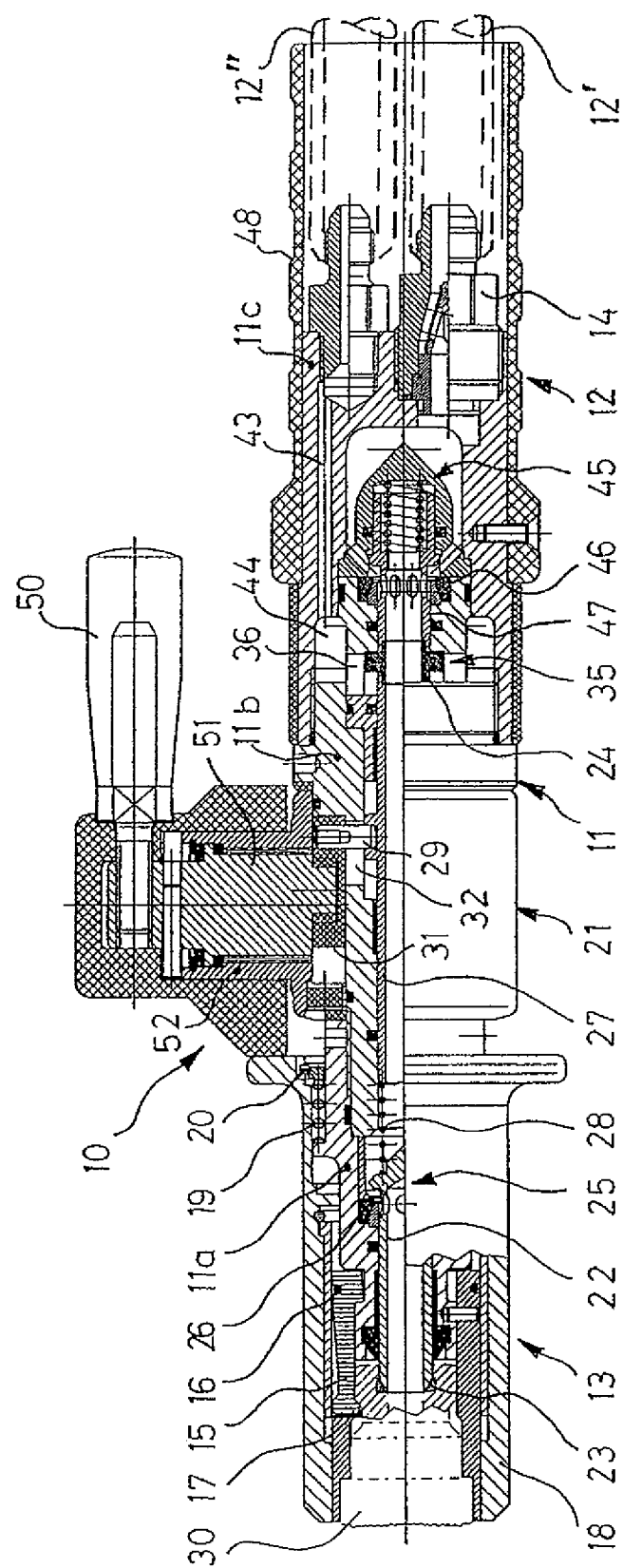
FIG. 1 shows a side view of a connection coupling with an integrated switch unit, with the connection coupling being shown in a longitudinal semi-sectional view and in the position connected to a connection nipple.

FIG. 1 shows a preferred embodiment of a connection coupling 10 in the form of a so-called quick-action connection coupling which is coupled to a connection nipple indicated in this case on the left side. The connection coupling 10 comprises a tubular housing 11 with several mutually screwed-down housing parts 11a, 11b and 11c, with the right housing part 11c being used as the inlet region 12 and the left region as outlet 13 for the forwarding of the fluid to be transmitted to the connection nipple 30. A switch unit 21 with control lever 50 (cf. FIG. 2) is arranged around the middle housing part 11b. The inlet region 12 comprises a connection adapter 14 to which a fluid line 12' can be connected via a thread for supplying the fluid to be transferred. The connection adapter 14 with an inserted filter sleeve can be configured in adjustment to the fluid to be transferred, especially to the desired feed pressure values, opening cross sections, etc.

In the region of outlet 13, several oblong collet chucks 15 are provided which are arranged in tubular form and which can be spread in a radially outward fashion shortly before the insertion on the connection nipple 30. The oblong collet chucks 15 are pre-tensioned by an annular spring 16, so that the collet chucks 15 can spread radially to the outside in an automatic manner (as known by the aforementioned state of the art). At the left outer end with inwardly crimped surfaces, the collet chucks 15 comprise interlocking engagement profiles 17 which are configured so as to correspond to a groove-like connecting profile section of the connection nipple 30. Their configuration is also described in closer detail in the aforementioned state of the art, so that any further explanation can be omitted. It merely needs to be mentioned for reasons of completeness that in the region of the outlet 13 a sealing piston 22 is inwardly guided which comprises at its front face side a conical sealing surface 23 for sifting close to an inner sealing ring of the connection nipple 30, so that the gaseous and/or liquid fluid which substantially flows along the central axis of the connection coupling 10 cannot escape to the outside.

An outside sliding sleeve 18 is provided around the collet chucks 15, which sliding sleeve is guided on the cylindrical outside jacket of the housing part 11a which is on the left side in this case and is pre-tensioned with a pressure spring 19 in the direction away from the connection nipple 30. The pressure spring 19 rests on a support ring 20 and thus pushes the sliding sleeve 18 towards a control lever 50 with an eccentric shaft 51, the structure of which will be explained below in closer detail, especially by reference to FIG. 2.

The discharge valve 25 provided on the sealing piston 22 seals by means of a sealing ring as valve seat 26 relative to the sealing piston 22 in the closed position. The discharge valve 25 is pressurized by a pressure spring 28 which rests towards the right side on a switch slide 27 of the switch unit 21. This discharge valve 25 ensures that in the uncoupled position (not shown here) or shortly before the connection of the connection coupling 10 with the connection nipple 30 the fluid supplied through the connection adapter 14 cannot flow out. The switch slide 27 is displaced during the uncoupling of the connection coupling 10 from the connection nipple 30 by the switch unit 21 along the connection coupling axis and thus forms a ventilation valve 35 in combination with a sealing disk 24.

The ventilation valve 35 and the switch slide 27 are actuated by pivoting the control lever 50 because the eccentric shaft 51 which is connected with the same and is held in a sleeve 52 is coupled with the switch slide 27, namely through the engagement of several bolts 29 which are displaceably inserted into axial slots 32 and are in connection with an outside ring slide 31. It comprises an annular groove into which the lower end of the eccentric shaft 51 engages. The entire switch unit 21 is rotatable about said ring slide 31 with the control lever 50 because the sleeve 52 is rotatably held on the outside circumference of the middle housing part 11b.

As can be seen from the connection position of the connection coupling 10 as illustrated here, the engagement profile 17 of the collect chucks 15 is brought into engagement with the connection nipple 30 during the insertion on the connection nipple 30. By moving (pivoting by approx. 180°) the control lever 50 to the position as shown here, the sliding sleeve 18 is pushed over the collect chucks 15 and thus locked. When the pressure is applied (the beginning of the tank filling process), the sealing piston 22 is displaced at first to the left (also under the action of spring 28). When it sits close to the sealing surface 23, the valve seat 26 on the sealing piston 22 and thus the discharge valve 25 are opened under displacement of the sealing piston 22 to the right. In this process, the engagement profile 17 has already engaged on the correspondingly configured connecting profile section of the connection nipple 30. As a result of the axial movement of the sliding sleeve 18, the same engages over the radially outer ends of the collect chucks 15, so that they are held in an interlocked way on the connection nipple 30.

For releasing the connection coupling 10 and thus returning the connection position as shown here to the opening position, the sliding sleeve 18 is pushed back by the pressure spring 19 after the twisting of the control lever 50. After a short path, the collect chucks 15 can spread again in a radially outward manner. Since the fluid pressure was interrupted beforehand (e.g. by closing the refueling valves), the sealing piston 22 is pushed here to the right in the direction towards the inlet region 12 and the discharge valve 25 on the valve seat 26 is closed.

The inlet region 12 further comprises an inlet valve 45 with an associated valve seat 46 centrally in the housing 11 or the housing part 11c of the connection coupling 10. The inlet valve 45 is also axially displaceable by the control lever 50 and its eccentric shaft 51 by coupling with the switch slide 27. Said switch slide 27 displaces a valve slide 47 of the inlet valve 47 to the opening position via the sealing disk 24 in the illustrated connection position, so that the fluid flowing in from the inlet region 12 can flow through the valve slide 47 and a pass-through in the sealing disk 24 and the tubular switch slide 27 towards the outlet 13.

When the connection coupling 10 is released, the switch slide 27 is displaced via bolt 29 to the left by twisting the control lever 50 (by approximately 180°), so that the sealing disk 24 can detach from the sealing engagement. The pressure can thus decrease within the connection coupling 10 via the pass-through slots to a pressure compensation chamber 44.

As was mentioned above, the ventilation valve 35 is opened by the eccentric shaft 51 and the switch slide 27 during the uncoupling of the connection coupling 10. As a result, any still applying pressure medium can thus flow via the pressure compensation chamber 44 to a ventilation bore 43 which extends parallel to the central fluid passage (through valves 45, 35 and 25) in the housing part 11c of the connection coupling 10. The ventilation bore 43 opens into a second line 12" which is preferably arranged as a return hose and is enclosed by a housing cap 48 like the feed line 12' in order to be used as a handle for easy handling. The ventilation line 12" and the fluid line 12' which is connected to adapter 14 thus always extend substantially parallel with respect to each other.

Figure 2:
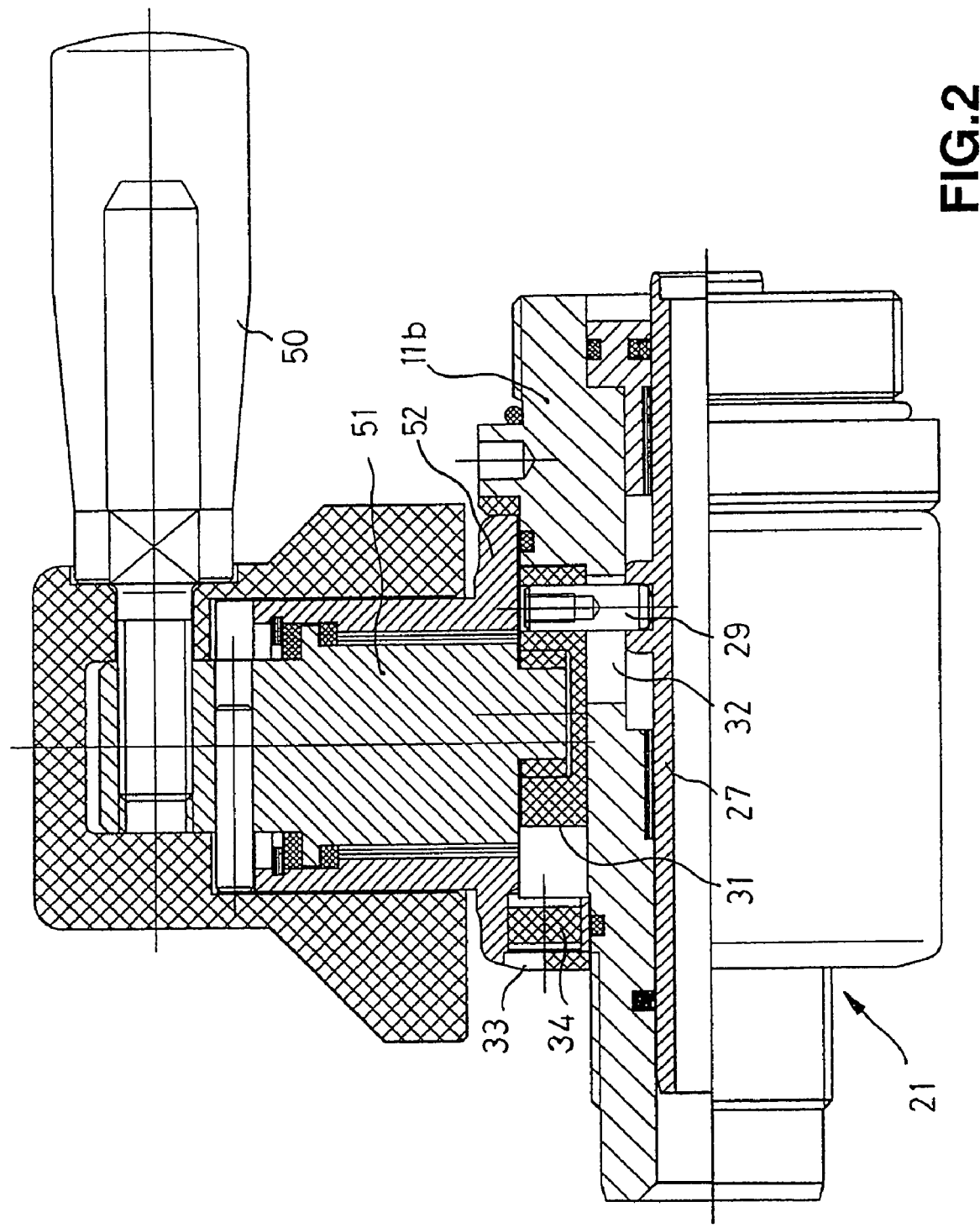
FIG. 2 shows an enlarged representation of the switch unit of the connection coupling according to FIG. 1.

FIG. 2 shows an enlarged view of switch unit 21, with a ventilation bore 33 being provided in sleeve 52 for a possible pressure decrease. It is closed off with a filter disk 34, especially a sintered filter, and lies opposite the ring slide 31 in the axial direction, which slide is movable in the axial direction by means of the eccentric shaft 51 and also axially displaces the inner switch slide 27 by a number of centimeters via bolts 29, to the extent that this is possible by the length of the axial slots 32.

The invention claimed is:

1. A connection coupling for transferring fluids, comprising a switch unit for actuating valves via a switch slide, the switch unit having an eccentric shaft, the eccentric shaft being held in a sleeve which is rotatably held about 360° on the circumference of a middle housing part, the switch slide being coupled by at least one bolt with an outer ring slide.

2. A connection coupling according to claim 1, wherein the at least one bolt comprises a plurality of bolts, the plurality of bolts coupling the switch slide to the outer ring slide.

3. A connection coupling according to claim 2, wherein the plurality of bolts are guided in axial slots in the middle housing part of the connection coupling.

4. A connection coupling according to one of the claims 1 to 3 further comprising a control lever.

5. A connection coupling according to claim 1, wherein the eccentric shaft engages in a circular annular groove on the outer ring slide.

6. A connection coupling according to claim 1, wherein the sleeve comprises a ventilation bore.

7. A connection coupling according to claim 6, wherein the ventilation bore is closed off by a filter disk.

8. A connection coupling according to claim 7, wherein the filter disk is a sintered filter.

9. A connection coupling for transferring fluids comprising:
   a switch unit for actuating valves via a switch slide, the switch slide having a control lever and an eccentric shaft, wherein the switch slide is coupled by at least one bolt with an outer ring slide.

* * * * *